(12) United States Patent
Sandmann et al.

(10) Patent No.: US 10,853,938 B2
(45) Date of Patent: Dec. 1, 2020

(54) ENHANCED PLATEN FOR PHARMACEUTICAL COMPOUNDING

(71) Applicant: Becton, Dickinson and Company, Franklin Lakes, NJ (US)

(72) Inventors: Christian Sandmann, Wayne, NJ (US); Erik Kurt Witt, Wycoff, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 211 days.

(21) Appl. No.: 14/847,552

(22) Filed: Sep. 8, 2015

(65) Prior Publication Data
US 2016/0071265 A1    Mar. 10, 2016

Related U.S. Application Data

(60) Provisional application No. 62/077,968, filed on Nov. 11, 2014, provisional application No. 62/072,054,
(Continued)

(51) Int. Cl.
*H04N 5/225* (2006.01)
*G06T 7/00* (2017.01)
(Continued)

(52) U.S. Cl.
CPC ........... *G06T 7/0012* (2013.01); *G01G 21/28* (2013.01); *G05B 19/4155* (2013.01);
(Continued)

(58) Field of Classification Search
CPC ... G06T 7/0012; G01G 21/28; G05B 19/4155
See application file for complete search history.

(56) References Cited

U.S. PATENT DOCUMENTS 3,453,422 A    7/1969  Susor
3,551,353 A    12/1970 Chen et al.
(Continued)

FOREIGN PATENT DOCUMENTS

CA    2477259 A1    9/2003
CN    103118712 A    5/2013
(Continued)

OTHER PUBLICATIONS

Scheraga, "Tech firms answer chanin pharmacy's call for productivity", Drug Store News, 2003, pp. 31-32.
(Continued)

*Primary Examiner* — Jonathan R Messmore
(74) *Attorney, Agent, or Firm* — The Webb Law Firm (57) ABSTRACT

A system for preparing and administering a prescribed fluidic pharmaceutical compound, such as a chemotherapy compound, includes a scale having a platen. The scale is in communication with a user display for displaying an output of the scale. An image capture device having a field of view for capturing at least one image of an object placed on the platen is provided in communication with the user display for displaying the captured image. The platen may include a visual identifier for identifying a portion of the field of view of the image capture device. The platen may also include a tackifier or absorbent material. The platen may be formed of a light-transmissible material.

13 Claims, 4 Drawing Sheets

Related U.S. Application Data filed on Oct. 29, 2014, provisional application No. 62/078,067, filed on Nov. 11, 2014, provisional application No. 62/072,160, filed on Oct. 29, 2014, provisional application No. 62/047,325, filed on Sep. 8, 2014.

(51) Int. Cl.

| | | |
|---|---|---|
| *G06K 9/00* | (2006.01) | |
| *G01G 21/28* | (2006.01) | |
| *G05B 19/4155* | (2006.01) | |
| *G06F 3/0481* | (2013.01) | |
| *G06F 3/0482* | (2013.01) | |
| *G06F 3/0484* | (2013.01) | |
| *H04N 5/232* | (2006.01) | |
| *G01G 19/00* | (2006.01) | |

(52) U.S. Cl.
CPC ........ *G06F 3/0482* (2013.01); *G06F 3/04817* (2013.01); *G06F 3/04842* (2013.01); *G06K 9/00577* (2013.01); *H04N 5/225* (2013.01); *H04N 5/2252* (2013.01); *H04N 5/2256* (2013.01); *H04N 5/23229* (2013.01); *G01G 19/00* (2013.01); *G05B 2219/31313* (2013.01); *G05B 2219/35113* (2013.01); *G06T 2207/10004* (2013.01)

(56) References Cited

U.S. PATENT DOCUMENTS

| | | |
|---|---|---|
| 3,584,204 A | 6/1971 | Susor |
| 3,587,856 A | 6/1971 | Lemelson |
| 3,627,423 A | 12/1971 | Knapp |
| 3,734,286 A | 5/1973 | Simjian |
| 3,914,058 A | 10/1975 | Knapp et al. |
| 3,965,340 A | 6/1976 | Renner et al. |
| 3,966,332 A | 6/1976 | Knapp et al. |
| 3,970,643 A | 7/1976 | Kee Woo et al. |
| 4,017,157 A | 4/1977 | van Riet |
| 4,063,823 A | 12/1977 | Grat |
| 4,087,184 A | 5/1978 | Knapp et al. |
| 4,165,633 A | 8/1979 | Raisanen |
| 4,273,816 A | 6/1981 | Toilette |
| 4,277,089 A | 7/1981 | Lockhart |
| 4,315,051 A * | 2/1982 | Rourke .................. B29C 55/02 264/164 |
| 4,469,146 A | 9/1984 | Campbell et al. |
| 4,476,381 A | 10/1984 | Rubin |
| 4,549,205 A | 10/1985 | Misaki et al. |
| 4,628,193 A | 12/1986 | Blum |
| 4,653,010 A | 3/1987 | Figler et al. |
| 4,655,026 A | 4/1987 | Wigoda |
| 4,676,650 A | 6/1987 | Bjorndal et al. |
| 4,676,776 A | 6/1987 | Howson |
| 4,695,954 A | 9/1987 | Rose et al. |
| 4,733,363 A | 3/1988 | Yamada et al. |
| 4,790,118 A | 12/1988 | Chilcoate |
| 4,804,273 A | 2/1989 | Tondello et al. |
| 4,810,243 A | 3/1989 | Howson |
| 4,829,650 A | 5/1989 | Galard |
| 4,835,372 A | 5/1989 | Gombrich et al. |
| 4,839,675 A | 6/1989 | Owen |
| 4,847,764 A | 7/1989 | Halvorson |
| 4,853,521 A | 8/1989 | Claeys et al. |
| 4,857,716 A | 8/1989 | Gombrich et al. |
| 4,860,899 A | 8/1989 | McKee |
| 4,874,764 A | 10/1989 | Ueda et al. |
| 4,879,650 A | 11/1989 | Kurimoto et al. |
| 4,918,604 A | 4/1990 | Baum |
| 4,972,657 A | 11/1990 | McKee |
| 5,031,642 A | 7/1991 | Nosek |
| 5,038,839 A | 8/1991 | Morimoto et al. |
| 5,072,798 A | 12/1991 | Franklin |
| 5,084,832 A | 1/1992 | Yamada et al. |
| 5,088,981 A | 2/1992 | Howson et al. |
| 5,094,786 A | 3/1992 | Nagashima et al. |
| 5,153,827 A | 10/1992 | Coutre et al. |
| 5,182,707 A | 1/1993 | Cooper et al. |
| 5,184,753 A | 2/1993 | Horak |
| 5,260,880 A | 11/1993 | Tump |
| 5,272,318 A | 12/1993 | Rousso et al. |
| 5,308,930 A | 5/1994 | Tokutu et al. |
| 5,317,506 A | 5/1994 | Coutre et al. |
| 5,328,208 A | 7/1994 | Garrison |
| 5,337,919 A | 8/1994 | Spaulding et al. |
| 5,341,077 A | 8/1994 | Chen et al. |
| 5,341,854 A | 8/1994 | Zezulka et al. |
| 5,344,043 A | 9/1994 | Moulding et al. |
| 5,348,061 A | 9/1994 | Riley et al. |
| 5,365,343 A | 11/1994 | Knapp |
| 5,390,796 A | 2/1995 | Kerfoot, Jr. |
| 5,395,174 A | 3/1995 | Koch et al. |
| 5,401,059 A | 3/1995 | Ferrario |
| 5,404,227 A | 4/1995 | Sumita et al. |
| 5,405,048 A | 4/1995 | Rogers et al. |
| 5,416,706 A | 5/1995 | Hagenbuch |
| 5,442,146 A | 8/1995 | Bell et al. |
| 5,444,480 A | 8/1995 | Sumita |
| 5,444,539 A | 8/1995 | van der Grift |
| 5,468,110 A | 11/1995 | McDonald et al. |
| 5,480,062 A | 1/1996 | Rogers et al. |
| 5,502,944 A | 4/1996 | Kraft et al. |
| 5,508,499 A | 4/1996 | Ferrario |
| 5,516,475 A | 5/1996 | Wilson |
| 5,523,560 A | 6/1996 | Manique et al. |
| 5,568,262 A | 10/1996 | LaChapelle et al. |
| 5,583,948 A | 12/1996 | Shibayama |
| 5,593,267 A | 1/1997 | McDonald et al. |
| 5,597,995 A | 1/1997 | Williams et al. |
| 5,601,314 A | 2/1997 | Burns et al. |
| 5,643,212 A | 7/1997 | Coutre et al. |
| 5,651,775 A | 7/1997 | Walker et al. |
| 5,713,485 A | 2/1998 | Liff et al. |
| 5,719,679 A | 2/1998 | Shimizu et al. |
| 5,720,154 A | 2/1998 | Lasher et al. |
| 5,721,433 A | 2/1998 | Kosaka |
| 5,747,744 A | 5/1998 | Kraft et al. |
| 5,753,868 A | 5/1998 | Diem |
| 5,758,095 A | 5/1998 | Albaum et al. |
| 5,781,442 A | 7/1998 | Engleson et al. |
| 5,797,515 A | 8/1998 | Liff et al. |
| 5,833,866 A | 11/1998 | Brown |
| 5,841,077 A | 11/1998 | Kolaci |
| 5,841,541 A | 11/1998 | Dlugos |
| 5,907,493 A | 5/1999 | Boyer et al. |
| 5,940,176 A | 8/1999 | Knapp |
| 5,963,136 A | 10/1999 | O'Brien |
| 5,966,457 A | 10/1999 | Lemelson |
| 5,969,317 A | 10/1999 | Espy et al. |
| 5,979,512 A | 11/1999 | McGregor et al. |
| 5,990,422 A | 11/1999 | Komori et al. |
| 6,000,828 A | 12/1999 | Leet |
| 6,005,959 A | 12/1999 | Mohan et al. |
| 6,006,828 A | 12/1999 | Kluth et al. |
| 6,068,156 A | 5/2000 | Liff et al. |
| 6,113,578 A | 9/2000 | Brown |
| 6,181,982 B1 | 1/2001 | Yuyama et al. |
| 6,202,923 B1 | 3/2001 | Boyer et al. |
| 6,234,964 B1 | 5/2001 | Iliff |
| 6,330,491 B1 | 12/2001 | Lion |
| 6,347,486 B1 | 2/2002 | Badillet |
| 6,364,517 B1 | 4/2002 | Yuyama et al. |
| 6,384,348 B1 | 5/2002 | Haga et al. |
| 6,438,451 B1 | 8/2002 | Lion |
| 6,466,879 B1 | 10/2002 | Cantu et al. |
| 6,473,169 B1 | 10/2002 | Dawley et al. |
| 6,478,147 B1 | 11/2002 | Brander et al. |
| 6,535,637 B1 | 3/2003 | Wootton et al. |
| 6,542,902 B2 | 4/2003 | Dulong et al. |
| 6,551,391 B1 | 4/2003 | Gerhardt et al. |
| 6,564,121 B1 | 5/2003 | Wallace et al. |
| 6,574,580 B2 | 6/2003 | Hamilton |

(56) References Cited

U.S. PATENT DOCUMENTS

| | | |
|---|---|---|
| 6,581,798 B2 | 6/2003 | Liff et al. |
| 6,605,784 B2 | 8/2003 | Eigenmann et al. |
| 6,694,334 B2 | 2/2004 | DuLong et al. |
| 6,711,460 B1 | 3/2004 | Reese |
| 6,731,324 B2 | 5/2004 | Levy |
| 6,738,723 B2 | 5/2004 | Hamilton |
| 6,771,369 B2 | 8/2004 | Rzasa et al. |
| 6,775,602 B2 | 8/2004 | Gordon, Jr. et al. |
| 6,781,689 B2 | 8/2004 | Chiba |
| 6,810,355 B1 | 10/2004 | Kreidler et al. |
| 6,813,473 B1 | 11/2004 | Bruker |
| 6,814,255 B2 | 11/2004 | Leff et al. |
| 6,816,625 B2 | 11/2004 | Lewis, Jr. et al. |
| 6,873,725 B2 | 3/2005 | Xu |
| 6,877,530 B2 | 4/2005 | Osborne et al. |
| 6,915,823 B2 | 7/2005 | Osborne et al. |
| 6,920,094 B2 | 7/2005 | Komaki |
| 6,922,652 B2 | 7/2005 | Edwards et al. |
| 6,937,339 B2 | 8/2005 | Yamazaki et al. |
| 6,970,094 B2 | 11/2005 | Yamashita et al. |
| 6,975,924 B2 | 12/2005 | Kircher et al. |
| 6,990,463 B2 | 1/2006 | Walter et al. |
| 6,995,664 B1 | 2/2006 | Darling |
| 6,998,542 B2 | 2/2006 | Wallisch |
| 7,006,893 B2 | 2/2006 | Hart et al. |
| 7,015,806 B2 | 3/2006 | Naidoo et al. |
| 7,017,622 B2 | 3/2006 | Osborne et al. |
| 7,017,623 B2 | 3/2006 | Tribble et al. |
| 7,028,723 B1 | 4/2006 | Alouani et al. |
| 7,070,097 B2 | 7/2006 | Blanford et al. |
| 7,096,212 B2 | 8/2006 | Tribble et al. |
| 7,107,106 B2 | 9/2006 | Engelson et al. |
| 7,117,902 B2 | 10/2006 | Osborne |
| 7,128,105 B2 | 10/2006 | Tribble et al. |
| 7,155,396 B2 | 12/2006 | Yuyama et al. |
| 7,163,035 B2 | 1/2007 | Khan et al. |
| 7,173,197 B1 | 2/2007 | Kasperek |
| 7,194,336 B2 | 3/2007 | DiGianfilippo et al. |
| 7,209,891 B1 | 4/2007 | Addy et al. |
| 7,230,529 B2 | 6/2007 | Ketcherside, Jr. et al. |
| 7,240,699 B2 | 7/2007 | Osborne et al. |
| 7,262,847 B2 | 8/2007 | Goodall et al. |
| 7,286,997 B2 | 10/2007 | Spector et al. |
| 7,297,108 B2 | 11/2007 | Iliff |
| 7,310,143 B2 | 12/2007 | Budd |
| 7,317,967 B2 | 1/2008 | DiGianfilippo et al. |
| 7,343,224 B2 | 3/2008 | DiGianfilippo et al. |
| 7,343,943 B2 | 3/2008 | Khan et al. |
| 7,357,045 B2 | 4/2008 | Rasmussen et al. |
| 7,363,115 B2 | 4/2008 | Anderson et al. |
| 7,375,294 B2 | 5/2008 | Kraft |
| 7,376,934 B2 | 5/2008 | Steinrisser et al. |
| 7,391,515 B2 | 6/2008 | Budd et al. |
| 7,427,002 B2 | 9/2008 | Liff et al. |
| 7,457,685 B2 | 11/2008 | D'Silva |
| 7,478,513 B2 | 1/2009 | Baldwin |
| 7,493,263 B2 | 2/2009 | Helmus et al. |
| 7,499,581 B2 | 3/2009 | Tribble et al. |
| 7,530,497 B2 | 5/2009 | Knowles et al. |
| 7,536,843 B2 | 5/2009 | Djurle et al. |
| 7,554,042 B2 | 6/2009 | Gregerson et al. |
| 7,555,557 B2 | 6/2009 | Bradley et al. |
| 7,560,720 B2 | 7/2009 | Voigt et al. |
| 7,581,953 B2 | 9/2009 | Lehmann et al. |
| 7,592,553 B2 | 9/2009 | Yuyama et al. |
| 7,597,247 B2 | 10/2009 | Helmin et al. |
| 7,599,516 B2 | 10/2009 | Limer et al. |
| 7,610,115 B2 | 10/2009 | Rob et al. |
| 7,620,479 B2 | 11/2009 | Kircher et al. |
| 7,620,563 B2 | 11/2009 | Tornaquindici |
| 7,620,568 B1 | 11/2009 | Parker-Malchak |
| 7,631,475 B2 | 12/2009 | Baldwin et al. |
| 7,633,018 B2 | 12/2009 | Leisinger et al. |
| 7,636,718 B1 | 12/2009 | Steen et al. |
| 7,643,134 B2 | 1/2010 | Berndt |
| 7,651,664 B2 | 1/2010 | Appoldt et al. |
| 7,681,606 B2 | 3/2010 | Khan et al. |
| 7,698,019 B2 | 4/2010 | Moncrief et al. |
| 7,706,915 B2 | 4/2010 | Mahapatra et al. |
| 7,734,478 B2 | 6/2010 | Goodall et al. |
| 7,753,085 B2 | 7/2010 | Tribble et al. |
| 7,765,108 B2 | 7/2010 | Goodall et al. |
| 7,769,221 B1 | 8/2010 | Shakes et al. |
| 7,771,659 B2 | 8/2010 | Ziegler |
| 7,801,642 B2 | 9/2010 | Ansari et al. |
| 7,814,731 B2 | 10/2010 | Bender et al. |
| 7,831,393 B2 | 11/2010 | Savva |
| 7,831,447 B2 | 11/2010 | Schuman |
| 7,837,103 B2 | 11/2010 | Suto |
| 7,845,551 B2 | 12/2010 | Helmin et al. |
| 7,847,970 B1 | 12/2010 | McGrady |
| 7,860,583 B2 | 12/2010 | Condurso et al. |
| 7,860,730 B1 | 12/2010 | Goodall et al. |
| 7,861,495 B2 | 1/2011 | Yuyama et al. |
| 7,873,435 B2 | 1/2011 | Yuyama et al. |
| 7,886,230 B2 | 2/2011 | Monnier et al. |
| 7,900,658 B2 | 3/2011 | Osborne et al. |
| 7,913,475 B2 | 3/2011 | Khan et al. |
| 7,913,720 B2 | 3/2011 | Tribble et al. |
| 7,917,329 B2 | 3/2011 | Hamamoto |
| 7,927,313 B2 | 4/2011 | Stewart et al. |
| 7,930,064 B2 | 4/2011 | Popovich, Jr. et al. |
| 7,930,066 B2 | 4/2011 | Eliuk et al. |
| 7,930,364 B2 | 4/2011 | Ramaswamy et al. |
| 7,937,290 B2 | 5/2011 | Bahir |
| 7,938,032 B2 | 5/2011 | Fernando |
| 7,941,915 B2 | 5/2011 | Yuyama et al. |
| 7,956,894 B2 | 6/2011 | Akers et al. |
| 7,964,805 B2 | 6/2011 | Yuyama et al. |
| 7,991,627 B2 | 8/2011 | Hutchinson et al. |
| 7,995,831 B2 | 8/2011 | Eller et al. |
| 8,024,913 B2 | 9/2011 | Khan et al. |
| 8,037,659 B2 | 10/2011 | Osborne et al. |
| 8,041,102 B2 | 10/2011 | Yuyama et al. |
| 8,073,238 B2 | 12/2011 | Nakanishi et al. |
| 8,140,349 B2 | 3/2012 | Hanson et al. |
| 8,140,351 B2 | 3/2012 | Tribble et al. |
| 8,140,395 B2 | 3/2012 | Murphy et al. |
| 8,151,835 B2 | 4/2012 | Khan et al. |
| 8,191,339 B2 | 6/2012 | Tribble et al. |
| 8,194,129 B2 | 6/2012 | Jones et al. |
| 8,209,941 B2 | 7/2012 | Osborne et al. |
| 8,219,413 B2 | 7/2012 | Martinez et al. |
| 8,220,503 B2 | 7/2012 | Tribble et al. |
| 8,224,483 B1 | 7/2012 | Ansari et al. |
| 8,229,763 B2 | 7/2012 | Laughland et al. |
| 8,234,128 B2 | 7/2012 | Martucci et al. |
| 8,266,878 B2 | 9/2012 | Luciano, Jr. et al. |
| 8,280,549 B2 | 10/2012 | Liff et al. |
| 8,284,305 B2 | 10/2012 | Newcomb et al. |
| 8,295,582 B2 | 10/2012 | Eller et al. |
| 8,301,410 B2 | 10/2012 | Chu et al. |
| 8,328,082 B1 | 12/2012 | Bochenko et al. |
| 8,345,989 B1 | 1/2013 | Bresolin et al. |
| 8,353,318 B2 | 1/2013 | Ranalletta et al. |
| 8,374,887 B1 | 2/2013 | Alexander |
| 8,374,965 B2 | 2/2013 | Friend et al. |
| 8,396,722 B2 | 3/2013 | Tanimoto et al. |
| 8,417,539 B2 | 4/2013 | Chapman et al. |
| 8,433,129 B2 | 4/2013 | Nakanishi et al. |
| 8,442,298 B2 | 5/2013 | Nakanishi et al. |
| 8,448,846 B2 | 5/2013 | Needhan et al. |
| 8,463,622 B2 | 6/2013 | Garms et al. |
| 8,477,989 B2 | 7/2013 | Bresolin |
| 8,489,425 B2 | 7/2013 | Moncrief et al. |
| 8,551,421 B2 | 10/2013 | Luchinger |
| 8,554,579 B2 | 10/2013 | Tribble et al. |
| 8,571,297 B2 | 10/2013 | Eller et al. |
| 8,571,881 B2 | 10/2013 | Rousso et al. |
| 8,571,886 B2 | 10/2013 | Chudy et al. |
| 8,678,047 B2 | 3/2014 | Tribble et al. |
| 8,682,047 B2 | 3/2014 | Lang et al. |
| 8,706,522 B2 | 4/2014 | Cohan et al. |
| 8,740,077 B2 | 6/2014 | Needham et al. |

(56) References Cited

U.S. PATENT DOCUMENTS

| | | |
|---|---|---|
| 8,763,651 B2 | 7/2014 | Staysky et al. |
| 8,775,198 B2 | 7/2014 | Wiener et al. |
| 8,818,821 B2 | 8/2014 | Fioravanti |
| 8,861,816 B2 | 10/2014 | Lang et al. |
| 8,869,297 B2 | 10/2014 | Hanov et al. |
| 8,881,980 B2 | 11/2014 | Magill |
| 8,908,163 B2 | 12/2014 | Young et al. |
| 8,958,112 B2 | 2/2015 | Matsui et al. |
| 8,989,895 B2 | 3/2015 | Holman et al. |
| 9,053,616 B2 | 6/2015 | Grabiner et al. |
| 9,073,688 B1* | 7/2015 | Gautreaux ............ B65D 81/264 |
| 9,121,751 B2 | 9/2015 | Michael |
| 9,138,693 B2 | 9/2015 | Aouad |
| 9,240,044 B2 | 1/2016 | Okuda et al. |
| 2001/0048027 A1 | 12/2001 | Walsh |
| 2002/0035412 A1 | 3/2002 | Kircher et al. |
| 2002/0057339 A1 | 5/2002 | Shoenfeld |
| 2002/0067411 A1 | 6/2002 | Thompson et al. |
| 2002/0100762 A1 | 8/2002 | Liff et al. |
| 2002/0139394 A1 | 10/2002 | Bronson |
| 2002/0145042 A1 | 10/2002 | Knowles et al. |
| 2003/0050731 A1 | 3/2003 | Rosenblum |
| 2003/0050802 A1 | 3/2003 | Jay et al. |
| 2003/0057114 A1 | 3/2003 | Brander |
| 2003/0073349 A1 | 4/2003 | Nagao et al. |
| 2003/0074223 A1 | 4/2003 | Hickle et al. |
| 2003/0078849 A1 | 4/2003 | Snyder |
| 2003/0105555 A1 | 6/2003 | Lunak et al. |
| 2003/0107654 A1 | 6/2003 | Ohmura |
| 2003/0136590 A1 | 7/2003 | Gluvakov |
| 2003/0139701 A1 | 7/2003 | White et al. |
| 2003/0140928 A1 | 7/2003 | Bui et al. |
| 2003/0144878 A1 | 7/2003 | Wilkes et al. |
| 2003/0158508 A1 | 8/2003 | DiGianfilippo et al. |
| 2003/0179287 A1 | 9/2003 | Kozic et al. |
| 2003/0204357 A1 | 10/2003 | Hamilton |
| 2004/0017475 A1 | 1/2004 | Akers et al. |
| 2004/0076318 A1 | 4/2004 | Faeldt et al. |
| 2004/0143459 A1 | 7/2004 | Engleson et al. |
| 2004/0150815 A1 | 8/2004 | Sones et al. |
| 2004/0172289 A1 | 9/2004 | Kozic et al. |
| 2004/0193454 A1 | 9/2004 | Foote et al. |
| 2004/0204954 A1 | 10/2004 | Lacko |
| 2004/0225528 A1 | 11/2004 | Brock |
| 2005/0080651 A1 | 4/2005 | Morrison et al. |
| 2005/0086008 A1 | 4/2005 | DiGianfilippo et al. |
| 2005/0130173 A1 | 6/2005 | Leaman et al. |
| 2005/0197930 A1 | 9/2005 | Polarine |
| 2006/0080041 A1 | 4/2006 | Anderson et al. |
| 2006/0080177 A1 | 4/2006 | Walter et al. |
| 2006/0106647 A1 | 5/2006 | Brummel et al. |
| 2006/0136260 A1 | 6/2006 | Ash et al. |
| 2006/0136261 A1 | 6/2006 | Ash et al. |
| 2006/0136268 A1 | 6/2006 | Ash et al. |
| 2006/0173714 A1 | 8/2006 | Grotzinger, Jr. |
| 2006/0200369 A1 | 9/2006 | Batch et al. |
| 2006/0238346 A1* | 10/2006 | Teller ................ B67D 3/0077 340/572.1 |
| 2006/0283766 A1* | 12/2006 | Koh ..................... A61J 7/02 206/557 |
| 2006/0287884 A1 | 12/2006 | Sandy et al. |
| 2007/0021929 A1 | 1/2007 | Lemo et al. |
| 2007/0043473 A1 | 2/2007 | Anderson et al. |
| 2007/0106425 A1 | 5/2007 | Anderson et al. |
| 2007/0156707 A1 | 7/2007 | Fuchs et al. |
| 2007/0162295 A1 | 7/2007 | Akhtar et al. |
| 2007/0189597 A1 | 8/2007 | Limer et al. |
| 2007/0228172 A1 | 10/2007 | Knowles et al. |
| 2007/0239482 A1 | 10/2007 | Finn et al. |
| 2008/0045811 A1 | 2/2008 | Iliff |
| 2008/0047760 A1 | 2/2008 | Georgitsis |
| 2008/0052120 A1 | 2/2008 | Iliff |
| 2008/0052121 A1 | 2/2008 | Iliff |
| 2008/0052122 A1 | 2/2008 | Iliff |
| 2008/0052123 A1 | 2/2008 | Iliff |
| 2008/0052130 A1 | 2/2008 | Iliff |
| 2008/0086326 A1 | 4/2008 | Moura et al. |
| 2008/0105468 A1 | 5/2008 | Ragazzini |
| 2008/0125897 A1 | 5/2008 | DiGianfilippo et al. |
| 2008/0195416 A1 | 8/2008 | Tribble et al. |
| 2008/0312861 A1 | 12/2008 | Casto et al. |
| 2009/0078606 A1* | 3/2009 | Conley ................ A61J 7/0472 206/534 |
| 2009/0110019 A1 | 4/2009 | Houde-Walter et al. |
| 2009/0154764 A1 | 6/2009 | Khan et al. |
| 2009/0154789 A1 | 6/2009 | Wolfe |
| 2009/0202108 A1 | 8/2009 | Faeldt et al. |
| 2009/0265185 A1 | 10/2009 | Finn et al. |
| 2009/0323108 A1 | 12/2009 | Shimma |
| 2009/0326504 A1* | 12/2009 | Kaneda ............ A61F 13/49011 604/385.23 |
| 2009/0326861 A1 | 12/2009 | Langford et al. |
| 2010/0019042 A1* | 1/2010 | Barkan .............. G06K 7/10683 235/462.41 |
| 2010/0057264 A1 | 3/2010 | Kircher et al. |
| 2010/0324936 A1 | 12/2010 | Vishnubhatla et al. |
| 2011/0029445 A1 | 2/2011 | Whittacre et al. |
| 2011/0031038 A1 | 2/2011 | Page |
| 2011/0184751 A1 | 7/2011 | Holmes |
| 2011/0202366 A1 | 8/2011 | Akers et al. |
| 2011/0234977 A1 | 9/2011 | Verdooner |
| 2011/0267465 A1 | 11/2011 | Alexander et al. |
| 2011/0307270 A1 | 12/2011 | Berkelhamer et al. |
| 2012/0010840 A1 | 1/2012 | Fankhauser et al. |
| 2012/0041778 A1 | 2/2012 | Kraft |
| 2012/0065987 A1 | 3/2012 | Farooq et al. |
| 2012/0070480 A1 | 3/2012 | Amos et al. |
| 2012/0196291 A1* | 8/2012 | Eickhoff .............. C12Q 1/6851 435/6.12 |
| 2012/0330684 A1 | 12/2012 | Jacobs et al. |
| 2013/0018356 A1 | 1/2013 | Prince et al. |
| 2013/0054256 A1 | 2/2013 | Holman et al. |
| 2013/0142406 A1* | 6/2013 | Lang .................... G06K 9/6293 382/128 |
| 2013/0194414 A1 | 8/2013 | Poirier et al. |
| 2014/0025206 A1 | 1/2014 | Matsui et al. |
| 2014/0059749 A1* | 3/2014 | Fofana .............. A41D 31/0061 2/457 |
| 2014/0302429 A1* | 10/2014 | Shoki ........................ G03F 1/24 430/5 |
| 2015/0010758 A1* | 1/2015 | Ito ...................... G01N 21/9508 428/403 |
| 2015/0272320 A1* | 10/2015 | Ranalletta ........... G06F 19/3462 348/143 |

FOREIGN PATENT DOCUMENTS

| | | |
|---|---|---|
| EP | 1803431 A1 | 7/2007 |
| GB | 2379037 A | 2/2003 |
| JP | 2005211541 A | 8/2005 |
| JP | 3186063 U | 9/2013 |
| JP | 2013238493 A | 11/2013 |
| JP | 201436791 A | 2/2014 |
| WO | 8700659 A1 | 1/1987 |
| WO | 03040980 A1 | 5/2003 |
| WO | 2006095850 A1 | 9/2006 |
| WO | 2008062485 A1 | 5/2008 |
| WO | 2012008393 A1 | 1/2012 |
| WO | 2012095279 A2 | 7/2012 |
| WO | 2014065872 A1 | 5/2014 |

OTHER PUBLICATIONS

ScriptPro, SP 200 with Collating Control Center Robotic Prescription Dispensing System, Available online as of Feb. 2004.

ScriptPro, SP 200 Robotic Prescription Dispensing System. Available online as of Feb. 2004.

ScriptPro, SP Automation Center 200TM (Space 200TM) Prescription Dispensing Automation Center, Available online as of Feb. 2004.

(56) References Cited

OTHER PUBLICATIONS

Seifert et al., "The Training of a Telepharmacist: Addressing the Needs of Rural West Texas", American Journal of Pharmaceutical Education, 2004, vol. 68:3, pp. 1-9.
Texas Administrative Code, Title 22, Examining Boards.
Tracy et al. Telemedicine Technical Assistance Documents "A Guide to Getting Started in Telemedicine", 2004, University of Missouri—School of Medicine, pp. 206-240.
Ukens, "Pharmacist shortage boosts telepharmacy", Drug Topics, 2002, vol. 146:11, p. 53.
United States Pharmacopeia, Chapter 797, the National Formulary, 2004, United States Pharmacopeial Convention, Inc. Rockville, MD.
Wills, "Drug Images and Drug Imprints: Delivering Tools for Accuracy in Your Pharmacy", Insights, 2004, p. 7.
Woodall, "Remote Order Entry and Video Verifications: Reducing After-Hours Medication Error in a Rural Hospital", Joint Commission Journal on Quality and Safety, 2004, vol. 30:8, pp. 442-447.
Yahoo Mail, Oct. 1, 2002, pp. 1-3.
Young, "Loan repayments help pharmacists provide care in medically underserved areas", American Journal Health-System Pharmacy, 2003, vol. 60, pp. 2186-2188.
Alexander, U.S. Appl. No. 11/056,511, filed Feb. 11, 2005.
Alexander, Office Action from U.S. Appl. No. 11/056,511, Apr. 8, 2008, pp. 1-12.
Alexander, Office Action from U.S. Appl. No. 11/056,511, Oct. 16, 2008, pp. 1-17.
Alexander, Office Action from U.S. Appl. No. 11/056,511, Apr. 13, 2009, pp. 1-14.
Alexander, Office Action from U.S. Appl. No. 11/056,511, Feb. 3, 2010, pp. 1-15.
Alexander, U.S. Appl. No. 13/097,575, filed Apr. 29, 2011.
Alexander, Notice of Allowance from U.S. Appl. No. 11/056,511, Dec. 24, 2012, pp. 1-16.
Anderson, "A Narrative on the History of the Development of Telepharmacy in North Dakota From the Board of Pharmacy's Perspective Recorded by Excerpts from Board Minutes", North Dakota State Board of Pharmacy, 2006, pp. 1-5.
Angaran, "Telemedicine and telepharmacy: Current status and future implications", American. Journal of Health-System. Pharmacy, Jul. 1999, vol. 56:14, pp. 1405-1426.
Anonymous, "Pharmacy Annual Report-Chains covet customized pharmacy integration", Drug Store News, 2003, vol. 25:10, pp. 73-75.
Bynum et al., "The Effect of Telepharmacy Counseling on Metered-Dose Inhaler Technique among Adolescents with Asthma in Rural Arkansas", Telemedicine Journal and e-Health, 2001, vol. 7:3, pp. 207-218.
Cabral, Jr. et al., "Multimedia Systems for Telemedicine and Their Communications Requirements", IEEE Communications Magazine, 1996, pp. 20-27.
Cardinal Health Pharmacy Resources, "Improving after-hour pharmacy services for a community hospital by a remote pharmacy", 2003, Cardinal Health Inc., Houston Texas.
Casey et al., "Access to Rural Pharmacy Services in Minnesota, North Dakota, and South Dakota", University of Minnesota Rural Health Research Center-Working Paper 36, 2001, pp. 1-76.
Casey et al., "Pharmacist Staffing and the Use of Technology in Small Rural Hospital: Implications for Medication Safety", Upper Midwest Rural Health Research Center, Dec. 2005, pp. 1-43.
Clifton et al., "Provision of pharmacy services to underserved populations via remote dispensing and two-way videoconferencing", Am. J. Health-Syst. Pharm, Dec. 15, 2003, vol. 60, pp. 2577-2582.
Dakota Legislative Assembly, "Article 61-07 Hospital Pharmacy", Apr. 1, 1988.
Dakota Legislative Assembly, "Article 61-02-08-08 Telepharmacy in Hospitals", Dec. 1, 2003.
Dart, "Telepharmacy project offers a dose of technology", North Dakota Living, 2003, pp. 10-11.
Dart, "Digital Doses-Telepharmacies save people in small towns and rural areas from having to drive hundreds of miles to fill a prescription", Rural Electric, 2005, pp. 28-31.
ExactaMix, "Compounding Solutions: An advanced system for multi-ingredient solution compounding", Oct. 16, 2016, Baxter International Inc., Illinois, pp. 1-12.
Felkey, "Tools for Interactive Telepharmacy", Computer Talk, 2001, pp. 43-45.
Felkey, "Integrating Technology . . . at the Point of Care", Insight, 2004, pp. 8-10.
First Consulting Group, "Regulatory Compliance News Summary now includes global pharmaceutical regulatory news", Aug. 24, 2004, pp. 1-7.
Frady, "What's New in RxCare Plus 17.2", Insight, 2001, pp. 14.
Ghent, "Pharmacists to digital to fight shortage", Pharmacy Practice, 2004, vol. 20:11, pp. 47-48.
Halversoan, "Innovative Healthcare Information Technology Solutions for Rural Americans", Rural Wisconsin Health Cooperative. 2001. pp. 1-49.
Hix, "Outpatient Pharmacies "Booming":An Inside Look at the Growth of an Industry", Insight, 2004, pp. 14-17.
Horns, "cytostatic programs",Pharmweb Internet Posting by Hank & Horns Software, Jan. 1999, pp. 1-3.
Kastango et al., "USP chapter 797: Establishing a practice standard for compounding sterile preparations in pharmacy", American Journal Health-System Pharmacy, 2004, vol. 61, pp. 1928-1938.
Keeys et al., "Providing nighttime pharmaceutical services through telepharmacy", American Journal Health-System Pharmacy, 2002, vol. 59, pp. 716-721.
Kosub, "Device allows pharmacy care in remote areas", Pharmacy Practice, 2004, vol. 20:10, pp. 12-13.
Koutnik, "The Pharmacy of Tomorrow", Pharmacy Times, 2003, 3 pages.
Langham, "Taking Automation to New Levels", Insight, 2002, pp. 4-5.
Lustig, "Medication error prevention by pharmacists—An Israeli solution", Pharmacy World & Science, 2002, vol. 22:1, pp. 21-25.
Macinnis et al., "Environmental Scan of Pharmacy Technicians", 2001, Canadian Pharmacists Association, Ottawa, ON, pp. 1-16.
Morris, et al. "National survey of quality assurance activities for pharmacy-compounded sterile preparations", American Journal Health-System Pharmacy, 2003, vol. 601, pp. 2567-2576.
Muller, "Electronic Prescribing What You Need to Know!", Insight, 2002, pp. 10-12.
Muller, "Make Your Next Move QS/1's Premium Pharmacy ", Insight, 2003, pp. 13-15.
Napoli et al., "Picture archiving and communication in radiology", Rays, 2003,vol. 28:1, Abstract Only.
Nissen et al., "Can telepharmacy provide pharmacy services in the bush?", Journal of Telemedicine and Telecare, 2003, vol. 9, Supplement 2, pp. 39-41.
North Dakota State Board of Pharmacy Practice Act 2003.
Parks, "Using central-fill to maximize dispensing", Drug Store News, 2001, vol. 23:11, pp. 51, 75.
Parks, "ATM-Style Drug Dispensers Taking Hold in Areas With Limited Pharmacist Services", Pharmacy Practice News, 2004, vol. 31:01, 6 pages.
Peterson, "The North Dakota Telepharmacy Project: Restoring and Retaining Pharmacy Services in Rural Communities", Pharmacy Technology, 2004, vol. 20, pp. 28-39.
Petition for Inter Partes Review of U.S. Pat. No. 8,374,887, 2015.
Phillips, "Telepharmacy at Texas Tech", Apr. 2003 Presentation, Texas Tech University Health Sciences Center.
"Reference Manual for Computer Aided Therapy for Oncology", May 2005, Cato Research, North Carolina, pp. 1-255.
Rouse et al., "White paper on pharmacy technicians 2002: Needed Changes can no longer wait". American Journal Health-System Pharmacy, 2003, vol. 60, pp. 37-51.
"Rural Hospital Joins the Big Leagues with the Power of a Kodak PAS/Enterprise Information Management (EIM) Solution", Kodak Medical Systems, 2005.

\* cited by examiner

ENHANCED PLATEN FOR PHARMACEUTICAL COMPOUNDING

CROSS-REFERENCE TO RELATED APPLICATION

This application claims priority to U.S. Provisional Application Ser. No. 62/047,325, filed Sep. 8, 2014, entitled "Automated Visual Documentation Feature with Minimal User Input", U.S. Provisional Application Ser. No. 62/072,160, filed Oct. 29, 2014, entitled "Enhanced Pharmacist Review Module for a System for Preparing a Pharmaceutical Compound", U.S. Provisional Application Ser. No. 62/072,054, filed Oct. 29, 2014, entitled "Aerodynamically Streamlined Enclosure for Input Devices of a Medication Preparation System", U.S. Provisional Application Ser. No. 62/078,067, filed Nov. 11, 2014, entitled "Aerodynamically Streamlined Enclosure for Input Devices of a Medication Preparation System", and U.S. Provisional Application No. 62/077,968, filed Nov. 11, 2014, entitled "Enhanced Platen for Pharmaceutical Compounding", the entire disclosures of each of which are hereby incorporated by reference.

BACKGROUND OF THE INVENTION

1. Field of the Invention

The present invention is generally directed to scale systems and a method for preparing pharmaceutical compounds, such as chemotherapy compounds and, more specifically, to a scale system having an enhanced platen.

2. Description of Related Art

Many technical functions involving the preparation of drugs may be performed in a pharmacy by a pharmacy technician or licensed nurse, to be subsequently reviewed by a remote pharmacist. Systems have been developed that utilize gravimetric information, checked by an algorithm, to confirm the preparation of drugs having proper concentration. Scales may be used to gravimetrically ensure that proper drug concentrations are utilized throughout a compounding process. In instances in which the drug to be prepared is a sterile compounded medication, such as a chemotherapy drug or other cytotoxic drug, the drug preparation is often carried out in a flow hood. In these configurations, the scale is typically placed within the flow hood. As space within a flow hood is typically at a premium, a need exists for a scale having enhanced safety features with a minimal footprint within the flow hood.

In addition, the preparation of chemotherapy drugs or other cytotoxic drugs requires that pharmacy technicians wear protective gear, which can often be bulky and cumbersome. Accordingly, a need exists for an enhanced scale which allows for easier usability and enhanced safety features to reduce the risk of user exposure to toxic components of the drug compounding process.

SUMMARY OF THE INVENTION

In accordance with an aspect of the present invention, a system for sterile compounding includes a scale having a platen. The scale is in communication with a user display for displaying an output of the scale. The system also includes an image capture device having a field of view for capturing at least one image of an object placed on the platen, with the image capture device in communication with the user display for displaying the captured image. The platen includes a visual identifier for identifying a portion of the field of view of the image capture device.

In certain configurations, the image capture device is positioned above the platen. The scale may include a base portion supporting the platen, and the image capture device may be enclosed within a housing supported by a supporting arm connected to the base portion of the scale. The housing may include a barcode scanner having a sensor for detecting a barcode of an object placed on the platen. Optionally, the visual identifier of the platen includes a cross-shaped recess. In certain configurations, a plurality of recessed grooves are defined within the platen. In other configurations, a plurality of protrusions extend from a surface of the platen. Optionally, the platen may be configured for disposal after a single use. In a further configuration, the system further includes a cover disposed over at least a portion of a top surface of the platen, wherein the cover is configured for disposal after a single use.

In accordance with another embodiment of the present invention, a system for sterile compounding includes a scale, having a base portion and a disposable platen supported by the base portion. The scale is in communication with a user display for displaying an output of the scale. The system also includes an image capture device for capturing at least one image of an object placed on the platen, the image capture device in communication with the user display for displaying the captured image. The disposable platen may include an absorbent material for absorbing a liquid used in the sterile compounding process.

In certain configurations, the platen defines a receiving well therein and the absorbent material is provided within the receiving well. Optionally, the platen includes a tackifier.

In accordance with another embodiment of the present invention, a scale for sterile compounding includes a base portion and a platen supported by the base portion, with the platen having a coating layer disposed thereon. The coating layer provides a visual indicator in response to a fluid contacting the coating layer.

In certain configurations, at least a portion of the coating layer changes color in response to a cytotoxic material contacting the coating layer.

In accordance with another embodiment of the present invention, a scale for sterile compounding includes a base portion having an illumination source disposed therein and a platen supported by the base portion. The platen includes a light-transmissible portion for allowing the illumination source to illuminate an object placed on the platen.

In accordance with yet another embodiment of the present invention, a scale for sterile compounding includes a base portion having a barcode scanner disposed therein and a platen supported by the base portion. The platen includes a light-transmissible portion for allowing the barcode scanner to scan a barcode of an object placed on the platen.

In accordance with a further embodiment of the present invention, a system for sterile compounding includes a scale having a platen. The scale is in communication with a user display for displaying an output of the scale. The system also includes an image capture device having a field of view for capturing at least one image of an object placed on the platen. The image capture device is in communication with the user display for displaying the captured image. The platen includes an individual identifier for indicating to a user whether the platen has been used on the scale for a certain use duration.

Optionally, the system requires that a user is prevented from preparing a sterile compounding procedure until a use duration of the platen is confirmed to be within a compliance parameter.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 1:
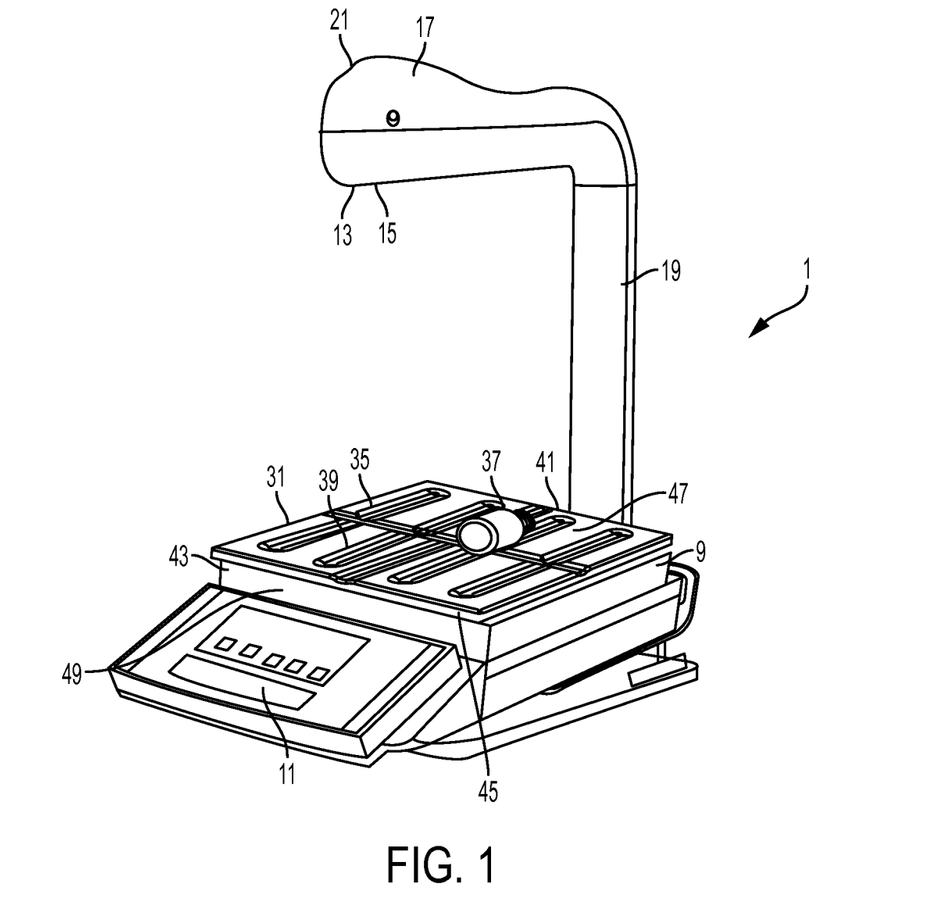
FIG. 1 is a perspective view of an exemplary pharmacy preparation system for preparing a pharmaceutical compound in accordance with an embodiment of the present invention.
Figure 2:
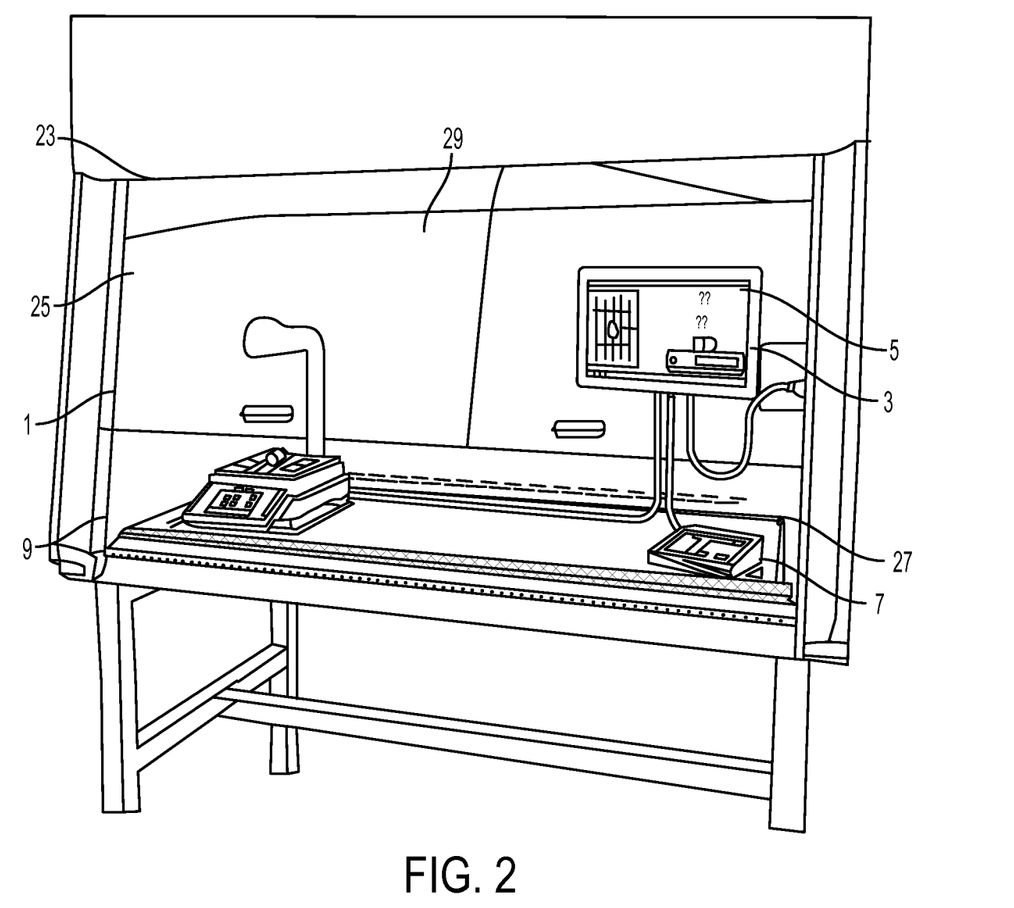
FIG. 2 is a perspective view of the pharmacy preparation system of FIG. 1 in a laminar flow hood having a user interface in accordance with an embodiment of the present invention.

With reference to FIGS. 1-2, a pharmacy preparation system, denoted generally as reference numeral 1, assists pharmacists or non-pharmacist technicians in preparing a syringe, drug vial, or intravenous (IV) bag with one or more prescribed pharmaceutical compounds. The pharmacy preparation system is operatively connected to a user interface 3 including a computer having a processor and a stored memory, as well as a display 5 and a user input device 7, such as a keyboard, mouse, etc. A scale 9 having a scale output interface 11 may be operatively connected to the user interface 3.

In one embodiment, a barcode scanner 13 may be operatively connected to at least one of the user interface 3 and the scale 9, such that the barcode scanner 13 may scan a medication vial having a barcode that is placed onto a portion of the scale 9. In another embodiment, an image capture device 15 may be operatively connected to at least one of the user interface 3 and the scale 9, such that the image capture device 15 may take a picture of an item, such as a medication vial, IV bag, or syringe placed onto a portion of the scale 9. In one embodiment, the image capture device 15 may capture a plurality of still images or running video of items placed onto a portion of the scale 9 throughout the medication compounding process for documentation and/or subsequent review of the medication compounding process.

In still another embodiment, at least one of the barcode scanner 13 and the image capture device 15 may be at least partially enclosed within a housing 17. In certain configurations, the housing 17 may fully enclose the barcode scanner 13 and the image capture device 15. Optionally, the housing 17 may include only one of the barcode scanner 13 and the image capture device 15. In one configuration, the barcode scanner 13 may be positioned within the housing 17 such that the barcode scanner 13 may easily scan a barcode of an item placed onto a portion of the scale 9 without further manipulation by the user. In another configuration, the image capture device 15 may be positioned within the housing 17 such that the image capture device may easily capture images of an item placed onto a portion of the scale 9 without further manipulation by the user.

Figure 3:
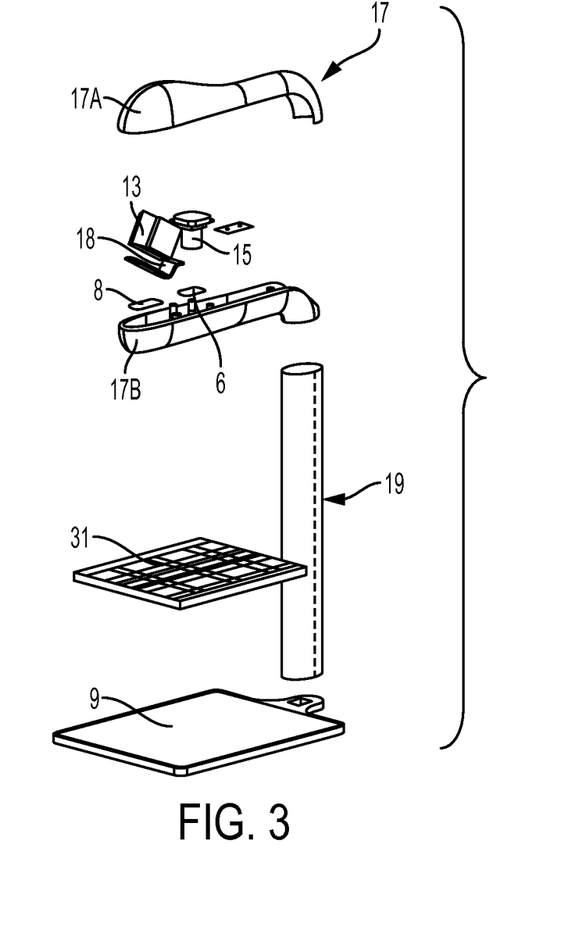
FIG. 3 is an exploded perspective view of a portion of the pharmacy preparation system of FIG. 1 in accordance with an embodiment of the present invention.

With specific reference to FIG. 3, the housing 17 may be formed of an upper portion 17A and a lower portion 17B which are interfaced to provide minimal surface perturbations to minimize any surface adherence of contaminants such as microbes or other pathogens. In one embodiment, the manufacturing of the housing 17 adheres to USP 797. Optical lenses 6, 7 may be fitted with the housing 17 to further ensure adherence to USP 797. In one configuration, optical lens 6 may be fitted with housing 17 in optical communication with image capture device 15. In another configuration, optical lens 7 may be fitted with housing 17 in optical communication with barcode scanner 13.

In one configuration, the barcode scanner 13 may be positioned within the housing 17 such that the barcode scanner 13 has a scanner that is offset from immediately scanning a barcode of an item placed onto a portion of the scale 9 without further manipulation by the user. In this configuration, accidental scanning is avoided. As shown in FIG. 3, the barcode scanner 13 may be positioned such that the sensor is angled with respect to a platen 31 of the scale, such as at a 45° angle by a mounting bracket 18. In this configuration, the user must actively place the objects to be scanned in range of the sensor of the barcode scanner 13. In another configuration, the image capture device 15 may be positioned within the housing 17 such that the image capture device may easily capture images of an item placed onto a portion of the scale 9 without further manipulation by the user.

The housing 17 may be positioned above a portion of the scale 9, such as supported by a supporting arm 19. As shown in FIG. 2, the pharmacy preparation system 1 may be positioned within a laminar flow hood 25 having an inlet air source 23 and an outlet air port 27 for creating a laminar flow of air within an interior 29 of the laminar flow hood 25. An exterior surface 21 of the housing 17 may have a shape and/or profile which is optimized to reduce disruption of the flow of air within the laminar flow hood 25.

Figure 4:
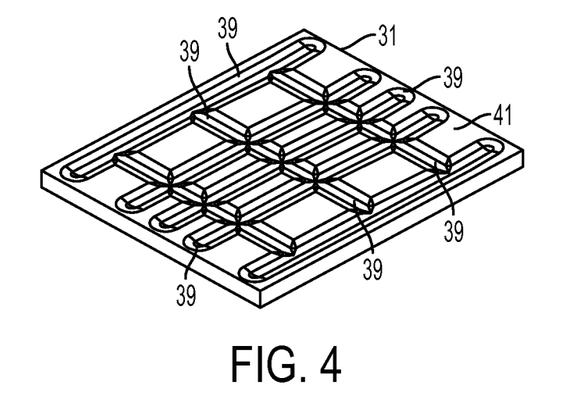
FIG. 4 is a perspective view of a scale platen in accordance with an embodiment of the present invention.
Figure 5:
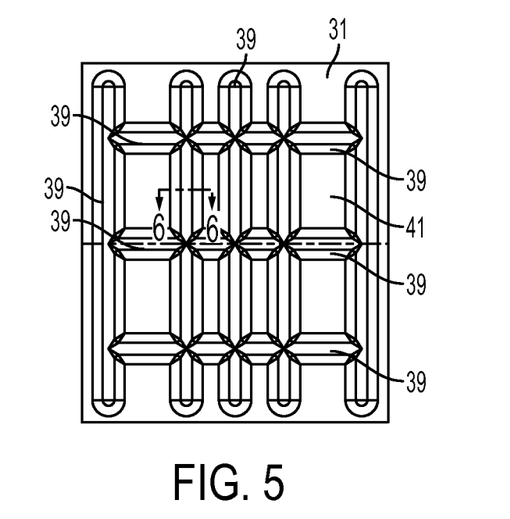
FIG. 5 is a top view of the scale platen of FIG. 4 in accordance with an embodiment of the present invention.
Figure 6:
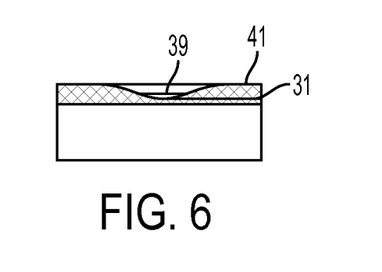
FIG. 6 is a cross-sectional side view of a groove of the scale platen of FIG. 4 taken along line D-D of FIG. 5 in accordance with an embodiment of the present invention.

Referring again to FIGS. 1-3, the scale 9 may include a base portion 43 which supports a platen 31 thereon. The scale 9 may be implemented as any suitable device for detecting a change in mass or weight when an object is placed thereon. Accordingly, the scale 9 may be simply configured as a device that sends a signal when the mass or weight of an object is greater or less than a predetermined threshold or as a high-precision scale that provides an accurate reading of the weight of an object placed thereon. Optionally, the base portion 43 houses a strain gauge load cell which measures the strain of an object placed on the platen 31, and a force transducer, such as a load cell sensor, which converts the force applied to the platen 31 into an electrical signal which may be relayed to the scale output interface 11. The base portion 43 supports the platen 31, such as a portion of the weighing surface of the scale 9, which may provide a visual indication, such as a cross recess 35, to the technician of a center, or other desired portion, of an image to be captured by the image capture device 15. This allows a technician to properly position drug compounding related medications 37 and related supplies within the field of view of the image capture device 15, such as the image capture device enclosed within the housing 17 positioned above the platen 31 of the scale 9. In one configuration, as shown in FIGS. 4-6, an upper surface 41 of the platen 31 may define a plurality of recessed grooves 39 and/or protrusions extending from a surface of the platen 31 to frictionally restrain drug compounding related medications 37 and related supplies on the upper surface 41 of the platen 31. In another configuration, the upper surface 41 of the platen 31 may include a tackifier or other frictionally enhancing surface to similarly restrain drug compounding related medications 37 and related supplies on the upper surface 41 of the platen 31. The arrangement of grooves 39 and/or protrusions may easily indicate to a user the center of the platen 31 which may be arranged to coincide with the center of the field of view of the image capture device 15.

The plurality of recessed grooves 39 and/or protrusions extending from a surface of the platen 31 may be configured to restrain any liquid material that is accidentally spilled on the upper surface 41 of the platen 31 during a compounding procedure. The plurality of recessed grooves 39 may define a receiving well 47 which serves to collect and restrain accidentally spilled material in a confined area within the platen 31 until proper disposal techniques may be employed. The surface of the platen 31 may be coated with a durable composition that resists degradation caused by exposure to caustic agents, such as chemotherapy compounds and drugs, as well as cleaning agents, such as bleach, isopropyl alcohol, and the like. In certain configurations, the durable composition may be an epoxy or epoxy-based paint or coating.

In another embodiment, the platen 31 may be removable from a base unit 43 of the scale 9. In this configuration, the platen 31 may be disposable and a technician may remove and dispose of the platen 31 after a single sterile drug compounding procedure. In this configuration, calibration of the scale 9 may be required for each individual platen 31 that is engaged with the base 43. In an alternative configuration, the platen 31 may include a disposable cover layer which may be removed and disposed of after a sterile drug compounding procedure. The disposable aspect of the platen 31 ensures that prior to each compounding procedure, the platen 31 is clean and that no contaminates may transfer to a component of the drug compounding procedure. The platen 31 may be formed of a metal, composite, or polymeric material, as is conventionally known for scale weighing surfaces. In a further configuration, each platen 31 and/or disposable cover layer, may include a unique individual identifier 45, embedded therein or attached to a surface thereof, which may be captured in an image captured by the image capture device 15. This allows for a technician and/or subsequent reviewer of the images captured by the image capture device 15 of the drug compounding procedure to verify that the platen 31 was changed between preparations. This may provide documented proof of a technician's compliance with institutional safety and sterility requirements. In certain configurations, the individual identifier 45 may be detected by the system software to determine whether the platen 31 has been replaced at a specified interval, for example, at a specified point during a shift, a day, a preparation and/or after contamination is detected. In a further configuration, the need for a user to change the platen 31 may be shown through the user interface 3, such as through a GUI. In a further configuration, the system may include safety features such that the user may be prevented from performing a compounding procedure until the platen 31 is replaced. A user may be prevented from preparing a sterile compounding procedure using the scale 9 and the platen 31 until the use duration of the platen 31 is confirmed to be within a compliance parameter.

In a further embodiment, the platen 31 may include an absorbent material which may absorb accidentally spilled material until proper disposal techniques may be employed. In a further configuration, at least one receiving well 47 of the platen 31 may include the absorbent material therein.

In certain situations, such as an aerosolation, it may be difficult for a technician to determine whether a cytotoxic material has been accidentally released from a container. Accordingly, the upper surface 41 of the platen 31 may include a coating layer which provides a visual indication, such as a color change, in response to fluid contacting the coating layer. In one configuration, the coating layer provides a visual indication in response to a leak or unintentional spill of material on the coating layer of the platen 31. The coating layer may be configured to provide a color change upon contact with a cytotoxic material. The visual indication may be visually observable to a technician or user of the system. In other configurations, the visual indication may be observable by the image capture device 15, or additional image capture device, such as an infrared camera.

In a further configuration, the platen 31 may be formed of a transparent and/or translucent material which permits passage of light therethrough. In this configuration, the base portion 43 of the scale 9 may also include a light source 49 for illuminating a portion of the platen 31, such as by passing light through the platen 31 from a location underneath the platen 31. This allows for enhanced visual inspection of drug compounding related medications 37 and related supplies to ensure they are free of defects. For example, the illuminated platen 31 may allow for a technician to visualize coring found in fluid filled IV bags. The light source 49 may be tuned to a certain wavelength appropriate to illuminate certain particles present within the drug compounding related medications 37. In a certain configuration, the platen 31 may include regions that are opaque or substantially opaque and regions that are transparent, substantially transparent, translucent, and/or substantially translucent in order to selectively allow for illumination of certain portions of the platen 31.

In another configuration, a scanner may be housed within the base portion 43 of the scale 9. The scanner may be a barcode scanner optically configured to scan barcode labels present on drug compounding related medications 37 through the translucent and/or transparent portions of the platen 31. The barcode scanner may be configured to obtain information from the barcodes to determine the contents of the vials placed on the platen 31. In a further configuration, a barcode writer or an integrated label printer may be positioned within the base portion 43 of the scale 9 to write information to the label of a drug compounding related medication 37 placed on the platen 31. In one configuration, the barcode writer may be configured to write information to the label of a drug compounding medication 37 pertaining to compounding results, date, time, lot numbers, and the like.

In yet a further configuration, the platen 31 may be in wireless communication with one or more system components. For example, a wireless interface may be provided in electrical communication with the platen 31 which may read and/or write data to a device provided on top of the platen 31. The wireless interface may be a Bluetooth connection to a pump connected to a drug vessel provided on the platen 31. Information transferred thereby may include pump operating parameters, such as patient specific flow rate and volumes. Accordingly, an automatically programmed device may be provided without requiring further user handling steps.

In yet a further configuration, the platen 31 may be configured to exhibit a visual indicator, such as a color change, when a weight measured by the scale 9 is within a specified tolerance. For example, the platen 31 may be equipped with an illuminated display which is activated once the scale 9 is stabilized and the unit measured is within a specified tolerance for a given drug compounding process.

In operation, the pharmacist/technician may be prompted through a series of display screens provided on the display of the user interface 3 to take the following steps. First, the operator may scan a first barcode with the barcode scanner 13 on a drug compounding related medication 37 including a drug to be reconstituted to prepare the prescribed pharmaceutical compound. The medication container may be placed on the scale 9 at the time of the scan, or a user may first scan the barcode and subsequently place the drug compounding related medication 37 on the platen 31 of the scale 9. Once the weight stabilizes, the system verifies, using a mathematical algorithm, that the measured weight is meeting the weight target plus/minus a predetermined tolerance. In addition, the image capture device 15 takes an image of the drug compounding related medication 37 and displays it to the user on the display of the user interface 3. The user then removes the drug compounding related medication 37 from the platen 31 and the image is saved to the data record of the drug preparation. If the system cannot verify that the measured weight is within that target weight tolerance, the technician is required to re-perform this step until the correct weight is achieved.

Next, the technician scans a second barcode of a fluid container of fluid that is to be mixed with the drug to be reconstituted. As discussed above, the medication container containing the fluid may be placed on the scale 9 at the time of the scan, or a user may first scan the barcode and subsequently place the drug compounding related medication 37 on the platen 31 of the scale 9. Once the weight stabilizes, the image capture device 15 takes an image of the drug compounding related medication 37 and displays it to the user on the display of the user interface 3. The user then removes the drug compounding related medication 37 and the image is saved to the data record of the drug preparation. Again, if the system cannot verify that the measured weight is within that target weight tolerance, the technician is required to re-perform this step until the correct weight is achieved.

Thereafter, the user mixes the drug to be reconstituted with the fluid in the fluid container, both drug compounding related medications 37, by injecting the fluid from the fluid container into the medication container. The medication container is then returned to the platen 31 of the scale 9 and the weight of the medication container is verified. Once the weight is stabilized and verified, the image capture device 15 automatically takes an image of the completed drug compounding related medication 37 based on a signal received from the scale and displays the image on the display of the user interface 3. If the system cannot verify that the measured weight is within that target weight tolerance, the technician is required to re-perform this step until the correct weight is achieved.

If the technician decides that any of the above-described images are not meeting certain requirements, there is the option to request a new or additional image. Requesting another picture may automatically switch the image capture device 15 into a "live video mode" displayed at the user interface 3. The technician can now move the medication container on the scale 9 to a preferred position and trigger the image capture through the user interface 3. As before, the captured image will be shown at the user interface 3 and by removing the item from the scale 9, the technician accepts the image and the system automatically moves to the next compounding step.

Once the drug preparation is complete, the system may optionally print a barcode label for placement on the completed drug preparation that includes encoded information representing the name of the pharmaceutical and patient information.

The pharmacy preparation system 1 may function in conjunction with several sequential computer-implemented modules for preparing and administering a prescribed fluidic compound, such as a chemotherapy compound. The modules each include code allowing for input from a user, generating output, and calculating and determining instructions for the preparation and administration of the pharmaceutical compound that may be implemented on one or more processors. More specifically, the modules may allow for a physician to enter a prescription for a patient that is subsequently verified for accuracy, prepared based on computer-aided instruction, verified based on a weight measurement, and administered to a patient. The modules may, during the drug preparation: (i) retrieve the prescription information data input by the physician in the CPOE module from the intra-hospital network; (ii) verify that the scanned barcode corresponds with the prescription information; (iii) determine if the weight of the syringe and/or IV bag is within a predetermined threshold accuracy level for the amount of the pharmaceutical to be administered; (iv) determine what adjustments must be made if the weight is not accurate; and (v) transmit data relating to the weight of the syringe and/or IV bag back to the intra-hospital network. These modules and processes may be implemented on several networked computing devices, or an independent computing device having its own processor where data and information is communicated between the computing devices using any suitable wired or wireless communication protocol, such as, but not limited to Ethernet, WiFi, cellular, Bluetooth, or the like.

Accordingly, the present invention guides a pharmacist or technician through the different compounding steps to prepare a medication order in a pharmacy by giving step-by-step instructions on a computer screen and verifying the different compounding steps by measuring the weight of the compounded liquids with a scale. The measured weight is then analyzed with a mathematical algorithm which checks if the necessary compounding accuracy has been accomplished. Every time an item is placed on the scale, a picture of the top of the scale is captured to create a visual documentation trail of the compounding process. The pictures are stored together with the recorded measurements from the scale and the algorithm result in a log file. If a measured weight of a drug is not in the predefined tolerance range of the expected weight, the software generates instructions to change the amount of the drug to bring it within the acceptable tolerance range. The software will not proceed to the next compounding step as long as the required tolerance of the present step has not been accomplished.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A system for sterile compounding, comprising:
   a scale having a base supporting a platen, the scale in communication with a user display for displaying an output of the scale; and
   an image capture device disposed within a housing and having a field of view for capturing at least one image of an object placed on the platen, the image capture device in communication with the user display for displaying the captured image,
   wherein the platen includes a visual identifier for identifying a portion of the field of view of the image capture device, and
   wherein the visual identifier is a plurality of recessed grooves in an uppermost surface of the platen for identifying a portion of a field of view of the image capture device, wherein the plurality of recessed grooves comprises at least one well configured to restrain liquid on the platen.

2. The system of claim 1, wherein the image capture device is positioned above the platen.

3. The system of claim 1, wherein the scale includes a base portion supporting the platen and the image capture device is enclosed within a housing supported by a supporting arm connected to the base portion of the scale.

4. The system of claim 3, wherein the housing includes a barcode scanner having a sensor for detecting a barcode of an object placed on the platen.

5. The system of claim 1, wherein the visual identifier of the platen includes a cross-shaped recess.

6. The system of claim 1, further comprising a plurality of protrusions extending from the uppermost surface of the platen.

7. The system of claim 1, further comprising a degradation-resistant coating layer on the uppermost surface of the platen.

8. The system of claim 1, wherein the platen is configured for disposal after a single use.

9. The system of claim 1, further comprising a cover layer disposed over at least a portion of a top surface of the platen, wherein the cover layer is configured for disposal after a single use.

10. A scale for sterile compounding, comprising:
    a base portion and a platen supported by the base portion, the platen having a coating layer disposed thereon,
    the coating layer providing a visual indicator in response to a fluid contacting the coating layer,
    wherein the platen includes a visual identifier including a plurality of recesses and at least one protrusion for identifying a portion of a field of view of an image capture device, wherein the plurality of recesses comprises at least one well configured to restrain liquid on the platen.

11. The scale of claim 10, wherein at least a portion of the coating layer changes color in response to a cytotoxic material in contact with the coating layer.

12. The scale of claim 10, wherein the visual indicator comprises a visually-observable indication.

13. The scale of claim 10, wherein the visual indicator comprises a change in an infrared spectrum.

* * * * *